(12) United States Patent
Damm et al.

(10) Patent No.: US 6,734,993 B1
(45) Date of Patent: May 11, 2004

(54) APPARATUS AND METHOD FOR EXPOSING A DIGITAL IMAGE ONTO A LIGHT-SENSITIVE MATERIAL

(75) Inventors: Tobias Damm, Munich (DE); Friedrich Jacob, Munich (DE); Bernhard Lorenz, Marzling (DE); Knut Oberhardt, Foeching (DE); Lothar Prause, Munich (DE); Gudrun Taresch, Munich (DE)

(73) Assignee: Agfa-Fevaert Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/495,802

(22) Filed: Feb. 1, 2000

(30) Foreign Application Priority Data

Feb. 5, 1999 (DE) .......................... 199 04 750

(51) Int. Cl.[7] ................................. H04N 1/40
(52) U.S. Cl. ................ 358/471; 358/475; 358/509; 358/474
(58) Field of Search .................. 358/471, 474, 358/506, 530, 513, 436, 509, 475

(56) References Cited

U.S. PATENT DOCUMENTS

| 4,701,045 | A | * | 10/1987 | Plummer | 355/20 |
|---|---|---|---|---|---|
| 5,202,723 | A | * | 4/1993 | Yamamoto et al. | 355/45 |
| 5,309,244 | A | * | 5/1994 | Katagiri | 358/296 |
| 5,327,263 | A | * | 7/1994 | Katagiri | 358/471 |
| 5,636,001 | A |  | 6/1997 | Collier | 355/41 |
| 5,703,700 | A | * | 12/1997 | Birgmeir et al. | 358/487 |
| 5,767,874 | A |  | 6/1998 | Wen et al. | 347/40 |
| 5,796,508 | A |  | 8/1998 | Suzuki | 359/224 |
| 5,801,812 | A |  | 9/1998 | Lo et al. | 355/22 |
| 5,801,814 | A |  | 9/1998 | Matsumoto | 355/40 |
| 5,826,959 | A |  | 10/1998 | Atsuchi | 353/20 |

FOREIGN PATENT DOCUMENTS

| DE | 2163688 | 6/1973 |
|---|---|---|
| DE | 4211128 | 10/1993 |
| DE | 19539736 | 5/1997 |
| DE | 19752479 | 6/1998 |
| WO | WO9211567 | 7/1992 |
| WO | WO9841894 | 9/1998 |

* cited by examiner

Primary Examiner—Kimberly Williams
Assistant Examiner—Negussie Worku
(74) Attorney, Agent, or Firm—Milde & Hoffberg, LLP

(57) ABSTRACT

A device and method are disclosed for exposing a digital image onto light-sensitive material. The device includes an image generation device that is controlled by a control device according to image data. In addition, the device has an optical system for reproducing the image onto light-sensitive material that is supported by a stage. A beam splitter, located in the exposure beam path, directs a portion of the light emitted by the image generation device onto a light sensor that has at least one sensor line.

19 Claims, 3 Drawing Sheets

APPARATUS AND METHOD FOR EXPOSING A DIGITAL IMAGE ONTO A LIGHT-SENSITIVE MATERIAL

BACKGROUND OF THE INVENTION

The invention relates to a device as well as a method for exposing a digital image onto light-sensitive material. The apparatus comprises an image generation device that is controlled by a control device in accordance with image data, an optical system for reproducing the image onto the light-sensitive material and a stage or platform for supporting the light-sensitive material The German Patent No. 42 11 128 C2 describes an image transfer method, where an image original is scanned point by point and line by line, where the generated signals are digitized and where the digital image signals are reproduced on photographic paper via an optical system using a light modulator, which is illuminated by a light source. The light modulator that is controlled in accordance with the image information, may be a light valve tube, a liquid crystal display or an arrangement containing ferro-crystals.

The U.S. Pat. No. 5,796,508 discloses a device for exposing a digital image onto photographic paper which also uses a light modulator. In this device, a DMD (digital micromirror device) is used as the light modulator. This patent points out that it is necessary to monitor the functionality of each individual pixel of the light modulator—in this case, of each individual mirror—to obtain a truly excellent image quality on the photographic paper. For this purpose, it is proposed to measure the light reflected by each mirror during the "off" phase—that is, when the mirrors reflect the light away from the photographic paper. The measured light is compared to a desired value, which corresponds to the amount of light that the mirrors should reflect under optimal conditions. If a deviation occurs between actual and desired values, the difference is taken into account in the control of the light modulator.

However, such an exposure correction method is only practicable for reflecting-type light modulators such as DMDs, because the control measurement does not interfere with the exposure beam path. This method is not suited for transmitting-type light modulators or for control of the entire system, namely the light modulator including the exposing optics.

SUMMARY OF THE INVENTION

Therefore, a principal object of the present invention is to provide a method for exposing a digital image onto light-sensitive material which ensures uniform illumination of the medium to be exposed, and thus, optimum image quality, and which is suitable for any digital exposure apparatus.

This object, as well as other objects which will become apparent from the discussion that follows, are achieved, according to the present invention, by an apparatus and a method for exposing a digital image onto light-sensitive material in which a beam splitter decouples a portion of the light emitted by the image generation device and this light portion is directed onto a light sensor having at least one sensor line.

According to the invention, during exposure of a digital image onto a light-sensitive material, between the image generation device and the light-sensitive material, a portion of the light is de-coupled from the exposure beam path and is directed onto a sensor. The sensor may be either a line sensor or an area sensor; however, it must be capable of obtaining information simultaneously with several pixels. The sensor may be an array of photo diodes or a CCD or any other light intensity measurement device. In the arrangement subject to the invention, the sensor measures, as the actual value, the amount of light that is directed from the image generation device, which is controlled by the control device, to the light-sensitive material. This actual value is dependent upon the control parameters, the current status of the image generation device, and possibly also, of the exposure optics if the de-coupling of the light is carried out after the path through the optics.

To make the actual value independent of the image data, it is also possible to cover the light-sensitive material with a shutter, to illuminate the light modulator and to pass the light on and de-couple it without modulation. In this case, it is advantageous that the actual value is not dependent on the image data; a disadvantage is that the correction cannot be carried out during the exposure but that an extra calibration phase is required.

The actual value is compared to the desired value that is theoretically required to expose the light-sensitive material in order to optimally transfer the image data to the light-sensitive material.

If the actual value deviates from the desired value, the difference is taken into account in the control of the image generation device. By comparing the desired values of the digital image that is to be transferred with the actual arriving light values at the sensor, it can be monitored, whether the image generation device optimally converts the image data into light signals or if deviations from the ideal image transfer values occur. Various error sources can be the reason for such a deviation. Causes for deviations between actual and desired value may be an uneven illumination of the image generation device, but also erroneous or changeable pixels of the image generation device, or an uneven light transmission through the optics in the exposure beam path. These errors are corrected by taking the deviations into account in the control of the image generation device. Thus, the sensor and the image generation device form a control circuit that adjusts the actual transferred amount of light to the one that corresponds to the image value and in this manner ensures an optimal image reproduction.

If each individual pixel of the image generation device is to be correctable, the sensor must be able to obtain the de-coupled light with a resolution that corresponds to at least that of the image generation device. In this manner, fluctuations or errors relating to individual pixels of the image generation device can be optimally corrected—regardless of whether the light modulator is reflecting or transmitting. Irregularities in the illumination of the image generation device caused by the illumination device can be corrected easily in this manner as well. If the resolution of the sensor is lower than that of the illumination device, only large-area fluctuations in the image generation, such as an edge drop of the light source, can be taken into account.

An image generation device that is very cost-effective yet has a high resolution, and for which this invention can be employed in a particularly advantageous manner, is a printer head comprised of several segments. Such a printer head is described in the U.S. Pat. No. 5,767,874, for example. In this patent, several small DMD segments are placed next to each other. To ensure a smooth transition from the image of one segment to that of the next one, it is recommended to allow the images of the segments to overlap slightly, and to modulate the light intensity transmitted by the segments in the overlapping zone with functions that drop the intensity of one image to zero while raising that of the other image to the maximum value, such that the two segments always transmit a consistent value in the overlapping zone.

However, when overlapping the images of the segments, much of the resolution capacity of the DMDs is lost. This can be avoided by placing the images of the segments of an image generation device next to one another without overlapping and by adjusting the transition from one partial image to the next by using the invention described. All methods described in the U.S. Pat. No. 5,801,814 can be used to combine the partial images. Here, an image is split into partial images as well and the partial images are exposed onto photographic paper next to one another and in sequence. In this patent, the overlapping zone of the partial images is corrected by measuring the multiple intensity in the overlapping zone prior to exposing the photographic paper and then adjusting the illumination data in correspondence with this measurement. By having to obtain the data for the correction prior to the actual exposure, much time is lost in this copying process which can be avoided with the present invention, which performs the correction during the exposure. With the design subject to the invention, an overlapping zone is not required, the exposure correction can be performed during the exposure and all known light modulators—DMD, DRI ("Digital Reflective Imaging", reflecting LCDs, see the U.S. Pat. No. 5,826,959), GLV ("Grating Light Valve", see International Patent Publication No. WO 98/41893), LCD, PLZT, CRT, LED, etc.—can be used. Particularly well suited are all high-resolution light modulators that can be used in the digital projection technology.

Whenever the digital image is split into various partial images and these partial images must be combined on the light-sensitive material into a total image, the connecting areas of the partial images must be harmonized with one another. This harmonization is necessary regardless of how the partial images are being created or put back together. The partial images can be generated on several light modulators simultaneously and reproduced next to one another, or they can be generated on one light modulator in sequence. In the second case, the partial images are transferred to the light-sensitive material in sequence either by moving the light-sensitive material or the image generation device between the exposures of the partial images or by modifying the image beam path.

According to the invention, at least the light that is emitted by the image generation device and that reproduces the connecting zone and a defined area around it on the light-sensitive material is always split by a beam splitter and a portion of the light is directed to a sensor. To correct the connecting zone of two partial images, the sensor must feature at least two lines such that each line can be assigned to one partial image. The exposure values measured at the two lines are compared and the control is adjusted until the values agree taking into account possible image data.

It is, of course, also possible to split and obtain the light of the entire image. For this, a very large sensor is required.

The beam splitter that de-couples the portion of the light used for the exposure correction can be positioned in front or behind the objective.

If the partial images are combined to a total image by using a beam splitter, as shown in the embodiment of FIG. 2 and described hereinbelow, the second image that is generated at this beam splitter on the side opposite of the objective can be used to correlate the intensity of the exposure in the connecting zones of the partial images.

At the sensor, which may be a CCD, for example, the light obtained at each pixel is compared with the desired value of the light that is to be transferred for this pixel according to the image data. If the values deviate, the control of the respective pixel of the image generation device is adjusted until the actual value and the desired value correspond.

If a sensor with a low resolution is used—that is, a sensor with a number of pixels that is less than the number of pixels of the image generation device reproduced on the sensor—a 1:1 assignment of the pixels of the image generation device and the sensor is no longer possible. In this case, a specific number of pixels of the image generation device must always be assigned to a pixel of the sensor. The sum of the desired values of the pixels of the exposure device must then be compared to the actual value that is measured at the one pixel of the sensor. Thereafter, the deviations that occur per pixel on the sensor must be compared among adjacent pixels in order to make a statement about an uneven exposure structure.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
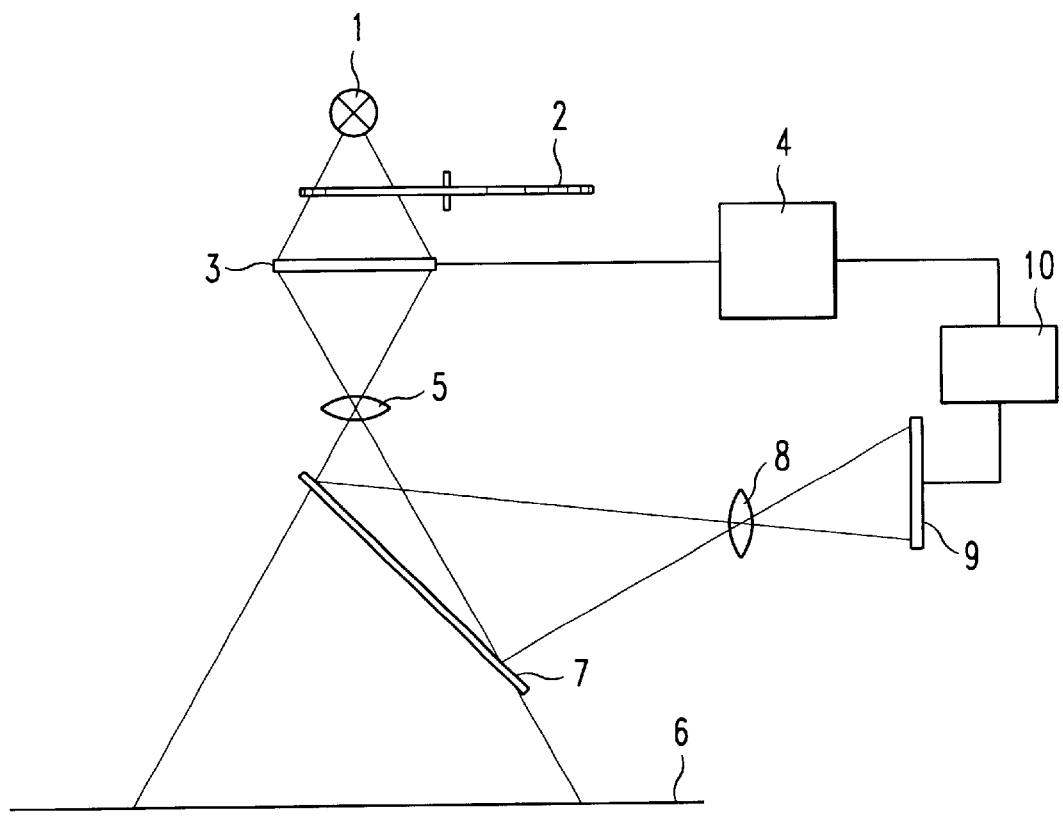
FIG. 1 is a schematic representation of an exposure device, where according to the invention a portion of the light is de-coupled using a mirror.

The preferred embodiments of the present invention will now be described with reference to FIGS. 1–3 of the drawings. Identical elements in the various figures are designated with the same reference numerals.

FIG. 1 shows a lamp 1 that illuminates a LCD 3 through the filter of a filter wheel 2. The LCD 3 is controlled by the control device 4 according to the specified digital image data, such that the light that passes through the LCD is modulated pixel by pixel. Through an objective 5, this modulated light is reproduced on photographic paper 6. A beam splitter 7, which de-couples a small portion of the modulated light through an additional objective 8 onto a photo diode array 9, is located in the exposure beam path. The information received at the photo diode array 9 is transferred to a computer unit 10, where this data is compared to the image data. The result of the comparison is transferred to the control device 4, which takes the result into account to control the light modulator 3.

Based on the digital image data, a color image is created on the photographic paper by transferring color components, namely, red, green and blue, in sequence onto the photographic paper by inserting the respective filter. For each of the color components, the corresponding image data is available at the control device. Based on this image data, the amount of light to pass through in a given period is specified for each pixel of the light modulator 3. The beam splitter 7, the optics 8 and the photo diode array 9 are adjusted such that a defined number of pixels of the light modulator corresponds to a respective photo diode.

The amount of light measured in a pre-determined time period is transferred from each photo diode to the computer unit 10. There, the desired value is determined—that is, the amount of light that according to the image data is to be transmitted from the number of corresponding image modulator pixels to the photo diode. The desired value is compared to the measured value and the difference is determined in relation to the desired value. This results in a relative error that can be compared with the relative error of the adjacent photo diode. Light fluctuations can be determined based on the differences in relative errors.

They are taken into account in controlling the light modulator by causing the pixel of the LCD, which corresponds to the photo diode that has measured on average a value that was too low, to transmit light until the difference is made up for, while the other pixels have already been switched off.

With this design, exposure fluctuations can be corrected such as the ones due to the edge drop of the illumination device that leads to an uneven illumination of the LCD or the ones due to changes in the transmission capability of the light modulator.

In order to measure and correct the exposure of individual pixels of the light modulator, a greater resolution of the sensor is required. In this case, the de-coupled image would have to be projected onto a CCD, for example, with at least the same resolution as the section of the light modulator that is to be monitored. In this case, the beam splitter 7, the optics 8 and the CCD would have to be adjusted in such a way so that exactly one pixel on the CCD corresponds to one pixel on the LCD 3. In this case, each deviation of the actual value from the desired value can be corrected directly for each pixel.

This exposure correction method can be used for a LCD with an illumination device or for any other digital image generation device. For example, a DMD, which must be illuminated reflectively, an LED array or a CRT could be used here. With a contact illuminator, such as a PLZT or an LED array with Selfoc lens array, the exposure correction according to the invention is also possible, however, de-coupling the light is more complicated. In this case, a light de-coupling unit could be integrated in the Selfoc lens arrays that are located between PLZT or LEDs and the photographic paper.

Figure 2:
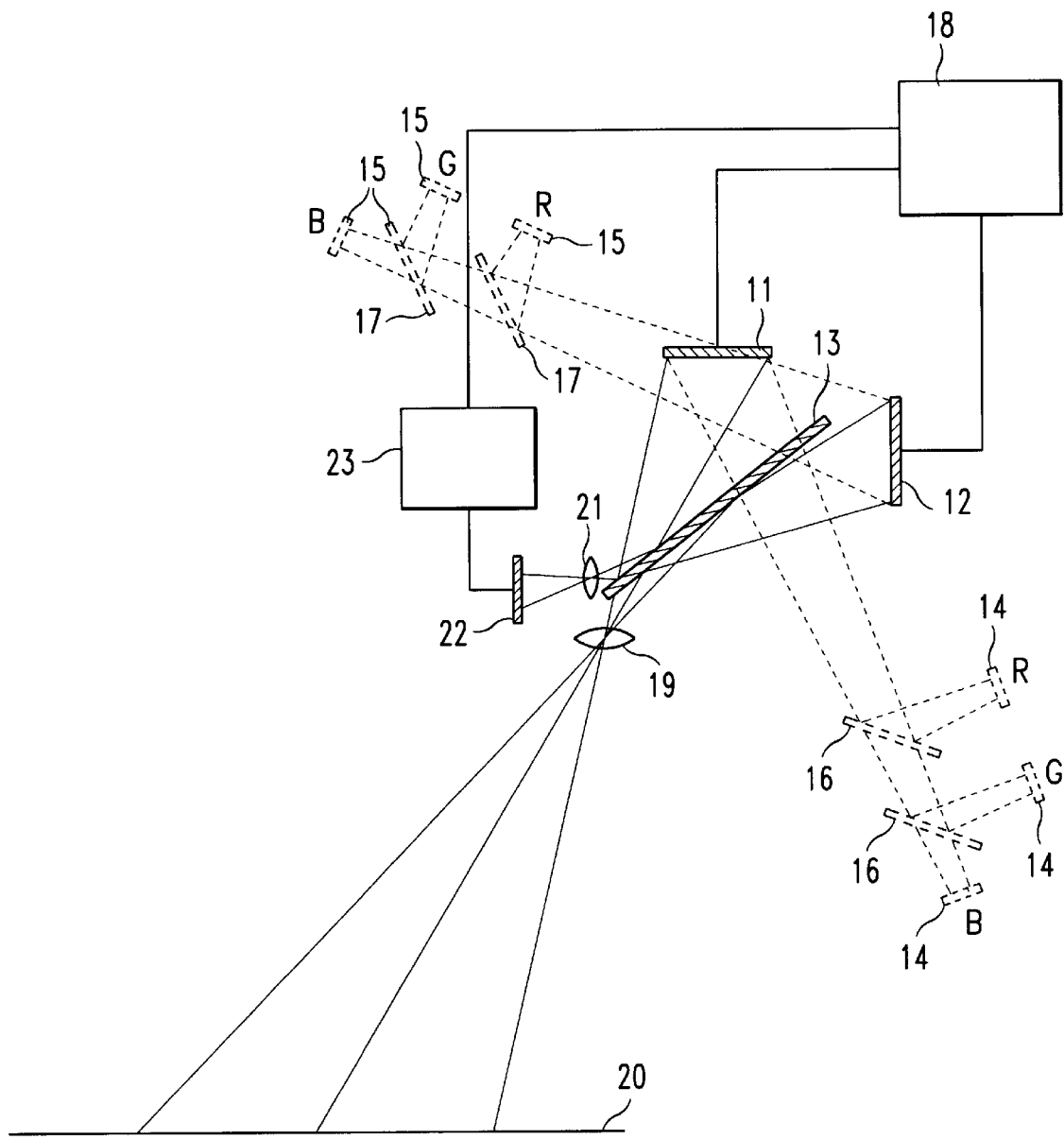
FIG. 2 is a schematic representation of an exposure device, where partial images of two light modulators are combined to one image.
Figure 3:
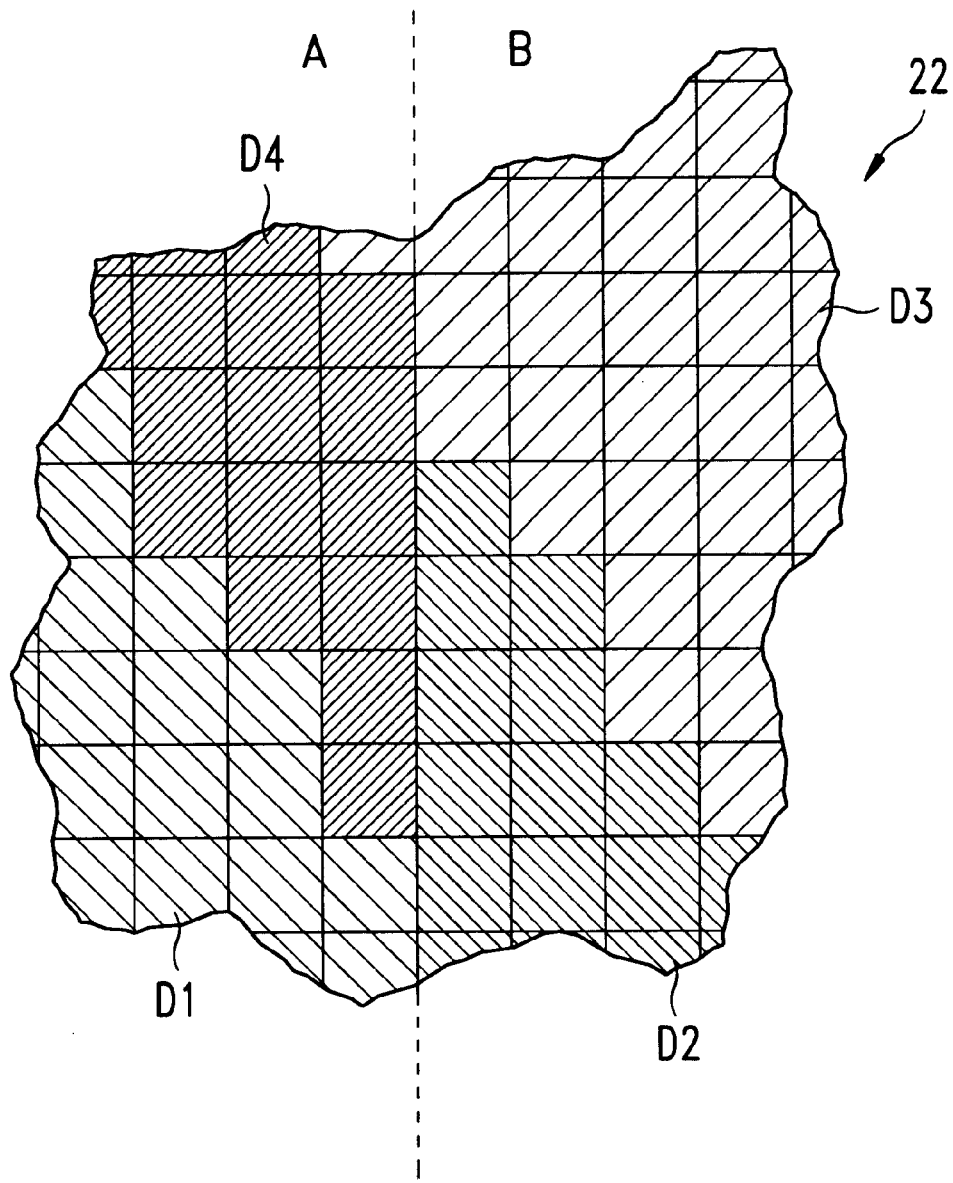
FIG. 3 is a schematic representation of the density image that occurs on the sensor from the connecting zone of the partial images.

The exposure correction according to the invention is particularly advantageous for the digital image generation device presented in FIG. 2. Here, the digital image generation device is constructed of two DMDs 11 and 12, whose images are combined to one image by a beam splitter 13. The two DMDs are illuminated by two LEDs 14 and 15, whose light is combined into one beam path each by beam splitters 16 and 17. The light of this illumination device is modulated at the two DMDs with the modulation being controlled by a control device 18 based on the digital image data. The image that is combined by the beam splitter 13 is reproduced on the photographic paper 20 through an objective 19. The identical reference image that is created on the rear side of the beam splitter, when viewed from the photographic paper, is reproduced through an additional objective 21 on a CCD 22. The CCD 22 is adjusted such that one pixel of the digital image generation device corresponds to one pixel on the CCD.

If the illumination of the light modulator of the image generation device occurs with one color after another, each color component can be corrected separately. However, if the exposure of the photographic paper occurs with multicolored light, for example by projecting the three color images of three differently illuminated light modulators on top of one another, the reference image must be split before, or with a CCD into the color components. This can be done, for example, with beam splitters, a filter wheel, or with filters on the CCD lines. The image obtained at the CCD is evaluated by a computer unit 23. The computer unit 23 compares this obtained image with the desired value that would be the theoretical result based on the image data with an optimal transmission and illumination.

In contrast to a reproduction device where only one light modulator is used, this design has the advantage that an image can be split into two partial images, where both partial images are exposed onto the paper with light modulators of relatively low resolution, however, a total image with relatively high resolution is created on the photographic paper. The problem is that the two partial images must be harmonized with one another, particularly at the edge of the connecting zone, such that there are no pronounced transitions from one partial image to the other.

The invention can be employed very advantageously for this purpose, because any measurable difference in the illumination of the pixels of different light modulators can be corrected by regulated control of the individual pixels of the light modulators.

As shown in FIG. 2, the de-coupled reference image, which is generated at the beam splitter 13 in any event, can be used for this control. This image, or a section thereof, corresponding to the connecting zone of the partial images, is obtained at CCD 22. For example, when reproducing a small line in one color, the result at CCD 22 will be the density image for the connecting area, which is schematically presented in FIG. 3. The densities D1 and D4 are measured in the partial area A, where the partial image of the first light modulator 11 is reproduced. The densities D2 and D3, reproduced by the second light modulator 12, are measured in the partial area B of the CCD 22. Although the digital data of a continuous line with uniform density is present in the original image, the densities D2 and D4 are significantly different. This means that regardless of the same starting data, for the actual control of the light modulators, in particular due to the illumination of the light modulators with different light sources, the individual pixels of the second light modulator transfer significantly less light to the connecting zone. To obtain a uniform reproduction of the digital image data—that is, a uniform density image—the light modulators must be controlled differently. The difference between D2 and D4 must be totaled over the current exposure time and post-exposed by the second light modulator. Advantageous with this design is that for exposure correction it is neither necessary to interfere with the exposure beam path nor to interrupt the exposure; only the control of the light modulator is altered.

With the described design, the illumination devices for the light modulators must be arranged in different spatial planes (in front or behind the plane of the drawing) as indicated in FIG. 2 by the broken lines, such that their light passes by the beam splitter to the DMDs. The DMDs must then be angled with regard to the plane of the drawing.

In implementing the image generation device built of several light modulators, it would be simpler to use beam splitter prisms instead of the indicated beam splitters 13, where these prisms combine the two images of the DMDs and reflect, or transmit, the light of the illumination device onto the DMDS. According to the complexity of the prisms, a reproduction of the image that is exposed onto the photographic paper is, of course, also automatically created in another reproduction plane, which again can be used for the exposure correction.

To create a higher resolution with a lower resolution light modulator, partial images created one after another at the light modulator can be exposed adjacent to one another onto the photographic paper. In this manner, an additional light modulator can be eliminated, however, the exposure procedure will last longer. The exposure of the partial images in sequence can be carried out either by moving the light modulator from one place to an adjacent one or by moving the optics or the photographic paper between the exposures. Here too, the invention proves very advantageous because the partial images can be corrected based on the reference images obtained at the sensor such that a smooth transition from one partial image to the next one occurs and an even total image is created on the photographic paper.

There has thus been shown and described a novel apparatus and method for exposing a digital image onto light-sensitive material which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An apparatus for exposing a digital image onto light-sensitive material comprising an image generation device that is controlled by a control device in accordance with image data; an optical system, which receives light emitted by the image generation device and projects the image onto the light-sensitive material; and a stage for supporting the light-sensitive material during exposure to the projected light, the improvement comprising a light sensor having at least one sensor line and a beam splitter disposed in the exposure beam path, said beam splitter directing a portion of the light emitted by the image generation device onto said sensor line during exposure of the image on the light-sensitive material;

whereby the light sensor supplies a signal representative of the light emitted by the image generation device to the control device to permit adjustment of the actual projected image to an optimal, desired image reproduction.

2. Apparatus as set forth in claim 1, wherein the light sensor has at least two sensor lines.

3. Apparatus as set forth in claim 2, wherein the light sensor includes a CCD.

4. Apparatus as set forth in claim 2, wherein the light sensor includes a photo diode array.

5. Apparatus as set forth in claim 1, wherein the image generation device includes a reflecting light modulator and an illumination device.

6. Apparatus as set forth in claim 5, wherein the image generation device includes a plurality of reflecting light modulators.

7. Apparatus as set forth in claim 6, wherein the images of the reflecting light modulators are combined to a total image on the light-sensitive material.

8. Apparatus as set forth in claim 1, wherein the image generation device includes a transmitting light modulator and an illumination device.

9. Apparatus as set forth in claim 8, wherein the image generation device includes several image modulators.

10. Apparatus as set forth in claim 1, wherein the image generation device includes LEDs.

11. Apparatus as set forth in claim 1, wherein the image generation device includes a CRT.

12. In a method for exposing a digital image onto light-sensitive material, where the image is created by an image generation device that is controlled by a control device in accordance with image data and is reproduced on the light-sensitive material by an optical system which receives light emitted by the image generation device and projects the image onto the light-sensitive material, the improvement wherein a beam splitter de-couples a portion of the light emitted by the image generation device during exposure of the image on the light-sensitive material, and directs it onto a light sensor having at least one sensor line, whereby the light sensor supplies a signal representative of the light emitted by the image generation device to the control device to permit adjustment of the actual projected image to an optimal, desired image reproduction.

13. Method as set forth in claim 12, wherein the light obtained at the sensor is taken into account in the control of the image generation device.

14. Method as set forth in claim 12, wherein the image is created by combining partial images that have been obtained by splitting the digital image data.

15. Method as set forth in claim 14, wherein the partial images adjacent to one another are exposed simultaneously onto the light-sensitive material.

16. Method as set forth in claim 14, wherein the partial images are exposed one after another.

17. Method as set forth in claim 16, wherein the light-sensitive material is moved between exposures of the partial images.

18. Method as set forth in claim 16, wherein the image generation device is moved between the exposures of the partial images.

19. Method as set forth in claim 16, wherein the reproduction beam path is altered between the exposures of the partial images.

* * * * *